(12) United States Patent
Chen

(10) Patent No.: US 8,192,017 B2
(45) Date of Patent: Jun. 5, 2012

(54) HINGE FOR THE TEMPLES AND THE LENS FRAME OF GLASSES

(76) Inventor: Tsung-Wen Chen, Taipei (TW)

( * ) Notice: Subject to any disclaimer, the term of this patent is extended or adjusted under 35 U.S.C. 154(b) by 140 days.

(21) Appl. No.: 12/874,120

(22) Filed: Sep. 1, 2010

(65) Prior Publication Data
US 2012/0050664 A1  Mar. 1, 2012

(51) Int. Cl.
*G02C 5/22* (2006.01)
(52) U.S. Cl. .............................. 351/153; 351/63; 16/228
(58) Field of Classification Search ................... 351/63, 351/121, 153; 16/228
See application file for complete search history.

(56) References Cited

U.S. PATENT DOCUMENTS 5,975,693 A * 11/1999 Malfroy et al. ............... 351/153
7,484,844 B2 * 2/2009 Spandl .......................... 351/153

* cited by examiner

*Primary Examiner* — Huy K Mai

(57) ABSTRACT

A hinge for the temples and the lens frame of glasses comprises engaging rods and bushings that are respectively formed at two sides of the lens frame and fronts ends of the temples. A spiral guiding slot and a guiding block are separately formed at an external surface of the engaging rod and at the inner surface of the bushing. The spiral guiding slots at the two sides of the lens frame have the same spiral orientation. The temples at the two sides of the lens frame are respectively slid upward and downward to be staggered in time of folding due to the cooperation of the spiral guiding slot and the guiding block. As a result, the dimension of the glasses is reduced, which conduces to convenient storage for users.

6 Claims, 5 Drawing Sheets

HINGE FOR THE TEMPLES AND THE LENS FRAME OF GLASSES

BACKGROUND OF THE INVENTION

1. Field of the Invention

The present invention relates to the glasses techniques, in particularly to a hinge for the temples and the lens frame of glasses.

2. Description of the Related Art

Generally, a hinge for the temples and the lens frame of glasses is shown in FIG. 1. Holding seats 30 are formed on temples 10 and a lens frame 20, respectively. A first hole 40 and a second hole 50 are defined on the holding seats 30. A rod 60 penetrates the first hole 40 and engages with the second hole 50. Thereby, the temples 10 are able to engage with the lens frame 20.

Superimposing one of the temples 10 on the other conduces to a pair of folded glasses as shown in FIG. 2. However, the dimension of the folded glasses is somewhat large, so it is inconvenient for users to store.

Therefore, the present invention is to amend the existing problem to the conventional glasses.

SUMMARY OF THE INVENTION

The object of the present invention is to provide a hinge for the temples and the lens frame of glasses to preferably reduce the dimension of the folded glasses.

The present invention adopts the following techniques:

A hinge for the temples and lens frame of glasses comprises engaging rods and bushings that are respectively formed at two sides of the lens frame and at front ends of the temples. A spiral guiding slot and a guiding block are respectively formed at an external surface of the engaging rod and at an inner surface of the bushing. Spinning orientations of the spiral guiding slots at the two sides of the lens frame are identical. The temples at the two sides of the lens frame are staggered in a way that the temples are respectively moved upward and downward in time of folding via the spiral guiding slots and the guiding blocks.

The engaging rods are formed at two ends of the lens frame, and the bushings are formed at front ends of the temples.

The engaging rods are formed at front ends of the temples, and the bushings are formed at two sides of the lens frame.

A cross-sectional view of the bushing is shown by a C-shape.

The external surface of the engaging rod is formed by the spiral guiding slot, and the inner surface of the bushing is formed by the guiding block.

The external surface of the engaging rod is formed by the guiding block, and the inner surface of the bushing is formed by the spiral guiding slot.

Thereby, the spiral guiding slot and the guiding block are respectively formed on the external surface of the engaging rod and on the inner surface of the bushing. The temples are staggered in time of being folded by separately sliding upward and downward. As a result, the dimension of the folded glasses is reduced, and it is convenient for users to store.

The present invention performs clearly by the following figures and the correspondent embodiments.

DETAILED DESCRIPTION OF THE PREFERRED EMBODIMENTS

Figure 1:
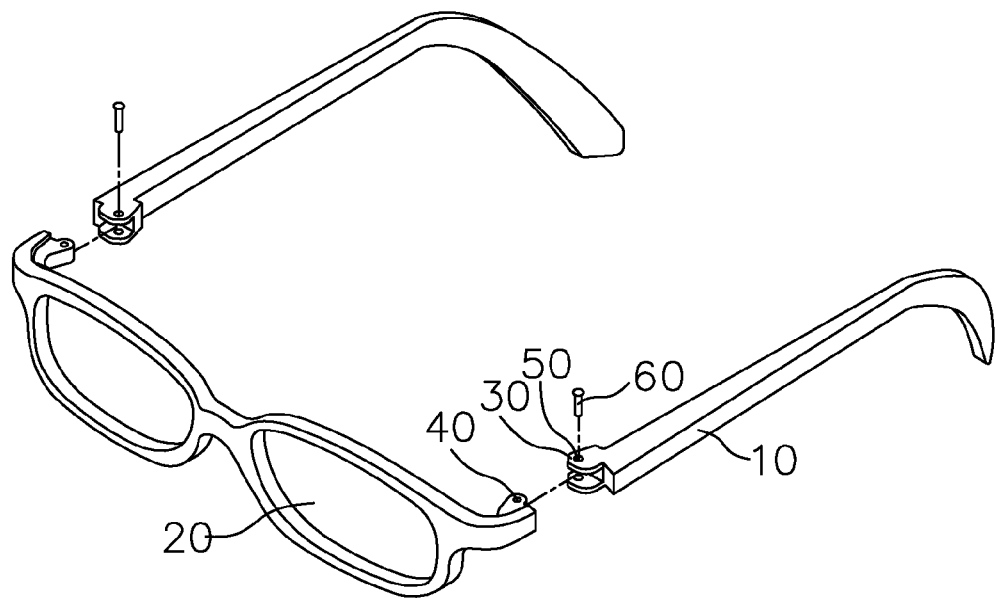
FIG. 1 is a schematic view showing a conventional pair of glasses.
Figure 2:
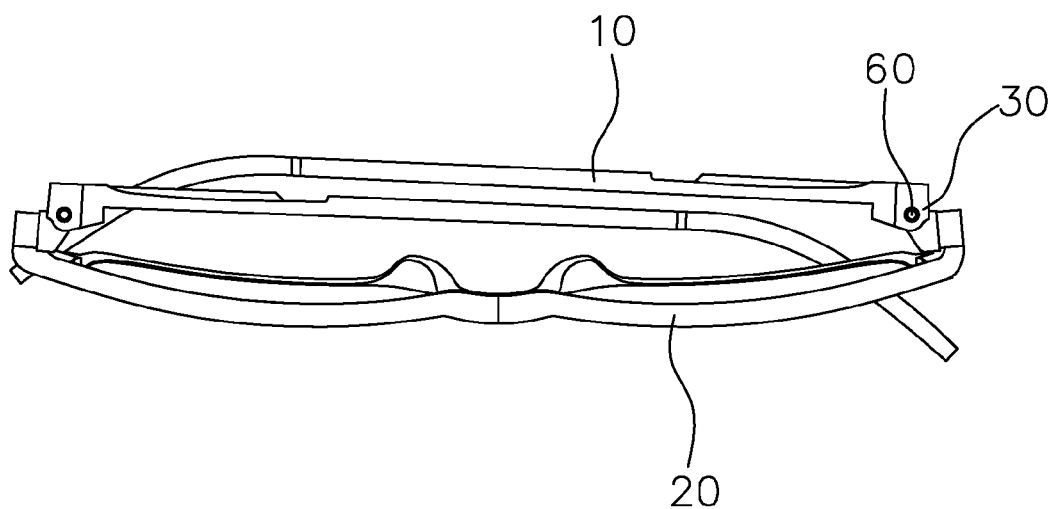
FIG. 2 is a top view of the conventional glasses in folding.
Figure 3:
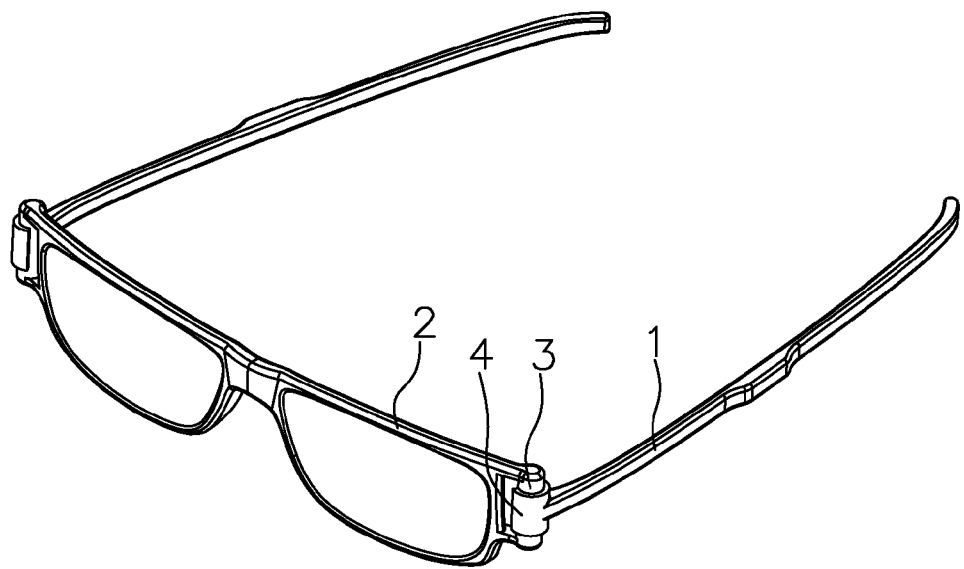
FIG. 3 is a schematic view showing glasses of the present invention.
Figure 4:
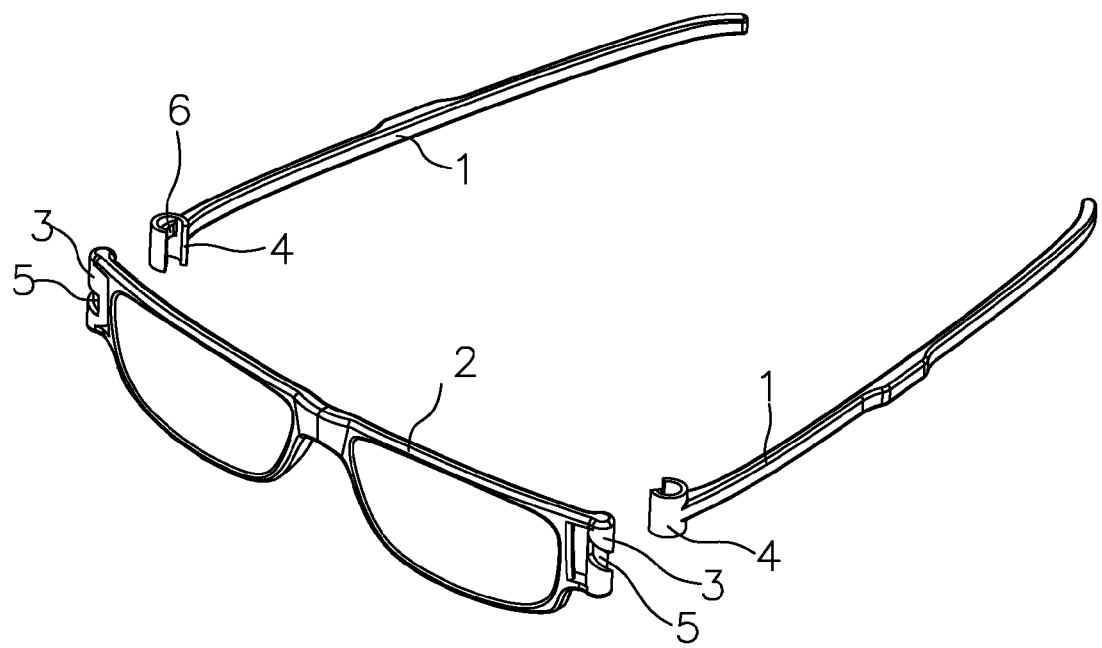
FIG. 4 is an exploded view showing the glasses of the present invention.
Figure 5:
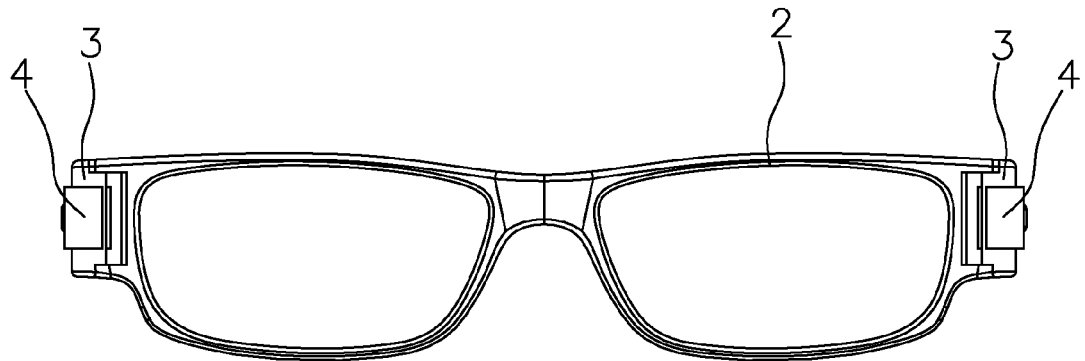
FIG. 5 is a front view of the present invention in unfolding.
Figure 6:
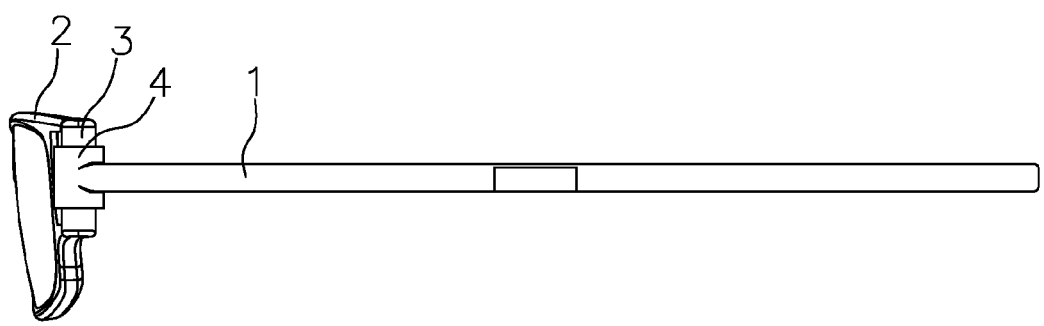
FIG. 6 is a side view of the present invention in unfolding.
Figure 7:
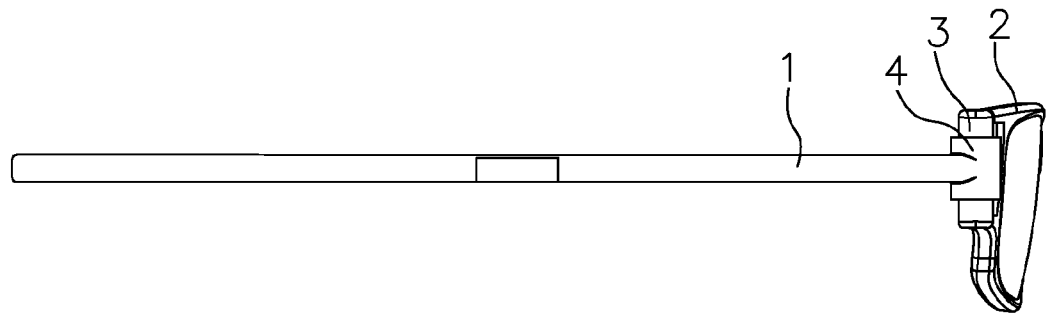
FIG. 7 is another side view of the present invention in unfolding.
Figure 8:
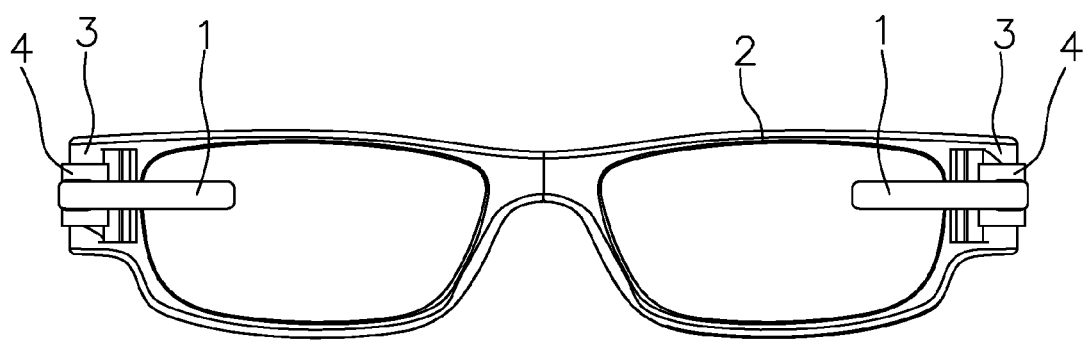
FIG. 8 is back view of the present invention in unfolding.
Figure 9:
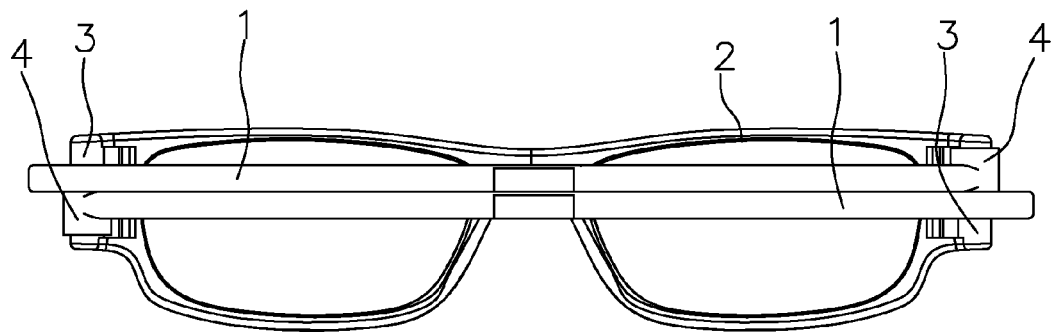
FIG. 9 is a back view of the present invention in folding.
Figure 10:
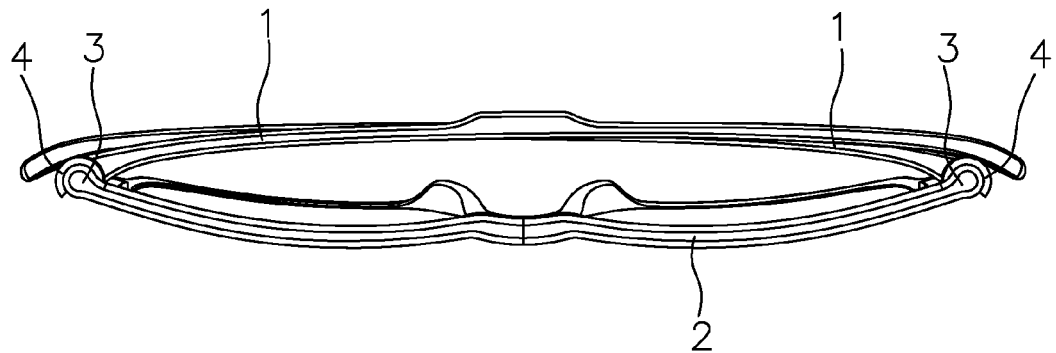
FIG. 10 is a top view of the present invention in folding.

FIGS. 3 and 4 show a preferred embodiment of the present invention.

A hinge for the temples and the lens frame of glasses comprises an engaging rod 3 and a bushing 4 that are respectively formed at two sides of the lens frame 2 and at front ends of the temples 1. The engaging rod 3 in this embodiment is respectively formed at the two ends of the lens frame 2, and the bushing 4 is respectively formed at the front ends of the temples 1. As it should be, the engaging rod could be alternatively formed at the front ends of the temples, and the bushing could be alternatively formed at the two ends of the lens frame. By means of the engaging rod 3 cooperating with the bushing 4, the hinge is correspondingly structured. Thereby, the temples 1 engage with the lens frame 2 for being freely unfolded or folded. In order to achieve a convenient assemblage, a cross-sectional view of the bushing 4 is shown by a C-shape.

A spiral guiding slot 5 and a guiding block 6 are respectively formed at an external surface of the engaging rod 3 and at an inner surface of the bushing 4. In this embodiment, the spiral guiding slot 5 is formed at the external surface of the engaging rod 3, and the guiding block 6 is formed at the inner surface of the bushing 4. As it should be, the guiding block could be alternatively formed at the external surface of the engaging rod, and the spiral guiding slot could be alternatively formed at the inner surface of the bushing. The construction is free under the condition that the spiral guiding slot 5 is able to cooperate with the guiding block 6, thereby allowing the temples 1 to be respectively shifted upward and downward in time of unfolding or folding. Moreover, the spinning orientations of the spiral guiding slots 5 at two sides of the lens frame 2 are identical, so that the temples 1 are able to be disposed staggered by being respectively slid upward and downward in time of folding. As a result, the dimension of the glasses is reduced after being folded, and it is convenient for users to store.

Above embodiments do not limit the spirit of the present invention. Utilizing the spiral guiding slot 5 and the guiding block 6 allows the temples 1 to be respectively slid upward and downward for an interlaced state while unfolding or folding. Therefore, the dimension of the glasses is decreased after folding. Herein, the forming positions of the engaging rod 3 and the bushing 4 as well as the disposition manners of the spiral guiding slot 5 and the guiding block 6, or the contour of the bushing 4 are not limited in the embodiments of the present invention. Variations made by the person skilled in the art in accordance with the main ideas of the present invention fall into the scope of the present invention.

I claim:

1. A hinge for temples and a lens frame of glasses comprising engaging rods and bushings that are respectively formed at two sides of said lens frame and at front ends of said temples; a spiral guiding slot and a guiding block being respectively formed at an external surface of said engaging rod and at an inner surface of said bushing; spinning orientations of said spiral guiding slots at said two sides of said lens frame being identical; said temples at said two sides of said lens frame being staggered by respectively moving upward and downward under a cooperation of said spiral guiding slots and said guiding blocks while folding.

2. The hinge as claimed in claim 1, wherein, said engaging rods are formed at said two ends of said lens frame, and said bushings are formed at said front ends of said temples.

3. The hinge as claimed in claim 1, wherein, said engaging rods are formed at said front ends of said temples, and said bushings are formed at said two sides of said lens frame.

4. The hinge as claimed in claim 1, wherein, a cross-sectional view of said bushing is shown by a C-shape.

5. The hinge as claimed in claim 1, wherein, said external surface of said engaging rod is formed by said spiral guiding slot, and said inner surface of said bushing is formed by said guiding block.

6. The hinge as claimed in claim 1, wherein, said external surface of said engaging rod is formed by said guiding block, and said inner surface of said bushing is formed by said spiral guiding slot.

* * * * *